(No Model.) 2 Sheets—Sheet 1.
N. CURTIS.
VALVE SYSTEM FOR FLUID PRESSURE CHAMBERS.
No. 533,636. Patented Feb. 5, 1895.
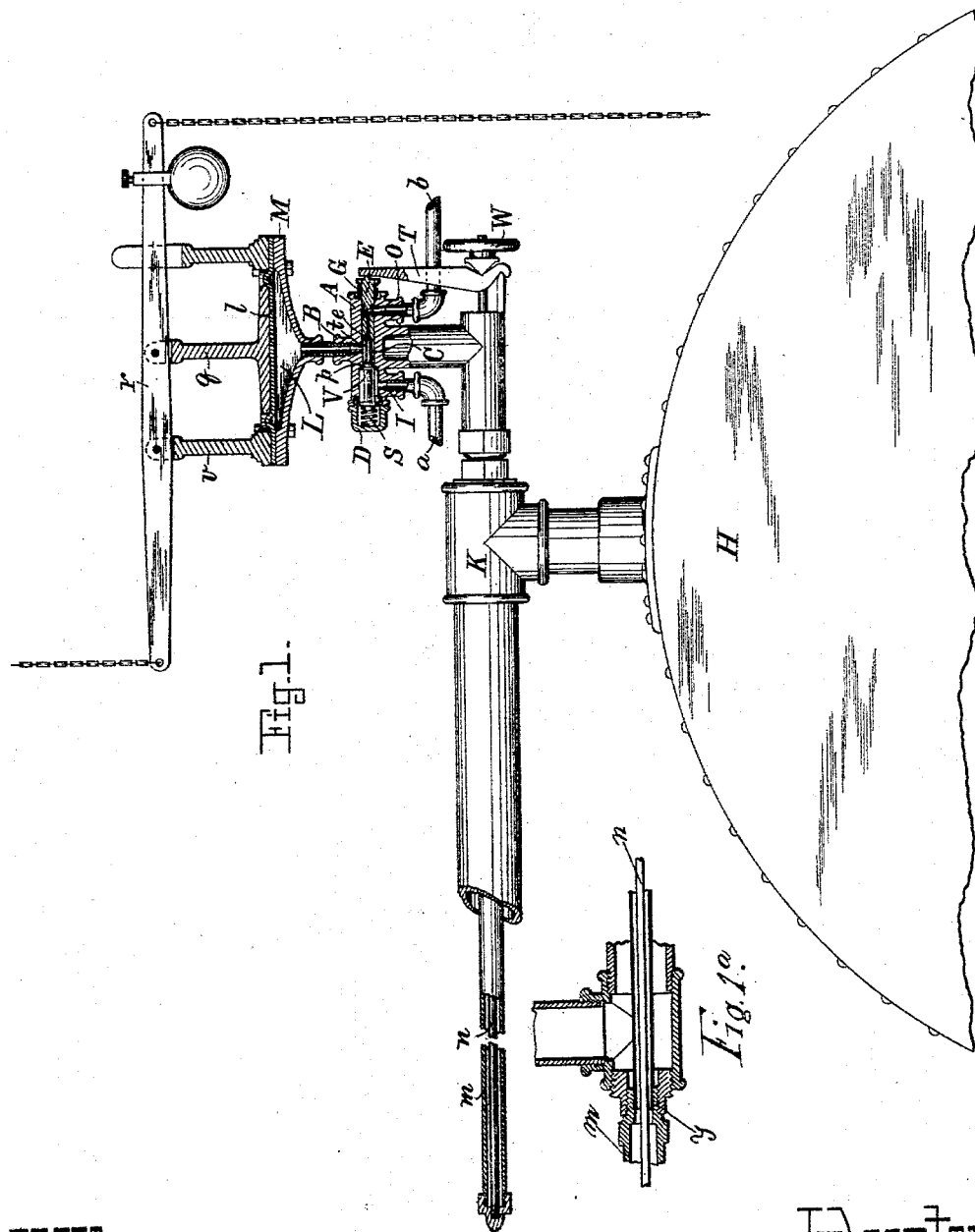

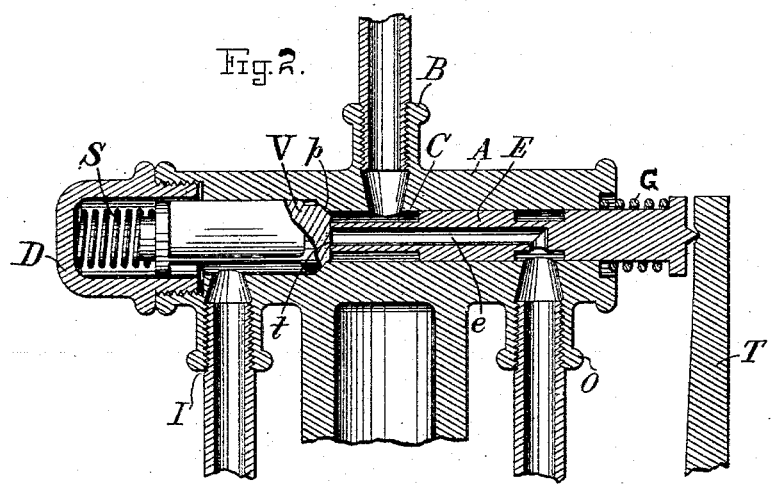

UNITED STATES PATENT OFFICE.

NELSON CURTIS, OF BOSTON, MASSACHUSETTS.

VALVE SYSTEM FOR FLUID-PRESSURE CHAMBERS.

SPECIFICATION forming part of Letters Patent No. 532,636, dated February 5, 1895.

Application filed April 23, 1891. Serial No. 390,080. (No model.)

*To all whom it may concern:*

Be it known that I, NELSON CURTIS, of Boston, in the State of Massachusetts, have invented a new and useful Improvement in Valve Systems for Chambers Containing Fluid Under Pressure, of which the following is a specification.

The invention consists in a shell or valve-body, provided with inlet and outlet ports and corresponding inlet and outlet valves, and a separate opening or passageway adapted to connect the interior of said shell or valve-body with a separate fluid pressure chamber, the said valves having a reciprocating motion to and from each other, and in part with each other, within said shell or valve-body, and one of them being perforated or hollow to form one of the said ports, which said port so formed is closed by contact between the two said valves. Either valve may be made hollow to form one of the ports—either its own port or the port of the other valve, and this port may be either the inlet or the outlet port of the valve body, and may be closed by the hollow valve moving up against the other valve or by the movement of the other valve against the hollow valve.

The invention consists also in details of construction.

The invention is particularly applicable to heat and pressure regulators but has a wide range of general application. In the drawings I have illustrated it in a form adapted to be used in a heat regulator.

Figure 1 is an elevation partly in section representing a valve-body and valves embodying my invention as used in combination with a thermostat and the motor of a heat regulator. Fig. 1ª is an enlarged detail showing the anchorage *y*. Fig. 2 is a vertical section of the valve-body and valves shown in Fig. 1 on an enlarged scale.

A is the shell or valve-body.

C is a valve chamber within said shell or body, and B is a hollow arm furnishing a passageway to connect said chamber C with another or separate pressure-fluid chamber, in this instance belonging to the motor apparatus within the heat controlling system.

I is a hollow arm containing an inlet passageway leading to the interior of said valve-body or valve chamber C, and O is a hollow arm furnishing the outlet or relief passageway therefrom.

V is the inlet valve having its port and seat at *p*. As shown it is normally seated by the force of a spring S pressing against a cap D closing one end of the valve-body A as shown.

E is the outlet valve. It is hollow or perforated, as shown and has within itself a port *e* which is the outlet port of the valve chamber C and is closed by the valve E seating itself against a projection *t* from valve V.

The valve E is inserted in the valve-body at the end opposite the cap D and a spring G tends to draw it from its seat. When a force exerted, as hereinafter described, on valve E in opposition to spring G is sufficient to overcome spring G, the valve E seats itself on the projection *t* and the port *e* is closed, and if the said force is not sufficient to also overcome spring S, the valve V remains seated and the port *p* maintains its closed condition; but if the said force does also overcome spring S, valve V is pushed from its seat and port *p* is opened, while port *e* remains closed. Both valves may be seated at the same time but they cannot both be off their seats together. When the inlet port is open the outlet port is closed. When the outlet port is open the inlet port is closed.

In the apparatus shown at Fig. 1, T represents the operating arm of a thermostat which controls valve E in opposition to spring G, while valve E in turn, controls valve V in opposition to spring S. H is a boiler. K is a T-pipe connection thereof, the horizontal arm of which contains a thermostat formed of two metals *m* and *n*, having different rates of expansion to control said arm T; the thermostat being anchored at *y*, as shown. W is a regulating wheel. M is the motor of the heat regulator having a fluid pressure chamber L provided with a flexible side *l* and connected with the chamber C of the valve-body A through hollow arm B as shown. The flexible side *l* supports a post *q* which is pivoted to a weighted lever *r*, connected by chains to the regulating dampers and doors of the furnace (not shown) of the boiler H. The lever *r* is also pivoted to the fixed arm *v* projecting from the motor M. The inlet passageway I is supposed to be connected by a pipe *a* with a street water main or other similar source of power, and the outlet or waste passageway O has a pipe $b$ to carry off the waste fluid.

In the operation the thermostatic arm is so adjusted when the fires are down that the outlet valve E is open under force of spring G and there is a free passageway escape from chamber L to chamber C and thence through port $e$ and outlet O to escape pipe $b$, and the dampers are in position to promote combustion; but when the fires are burning and the water or steam within the boiler is raised to a degree of heat beyond that required the thermostatic arm T is moved to close the valve E and then to open the valve V whereby communication is established between the pipe from the street main or other similar source of power and the chamber L, and fluid under pressure is admitted to move the flexible side $l$ of said chamber L and thus operate the dampers to check combustion. The valves E and V follow directly and indirectly the movements of the thermostatic arm T with almost inconceivable fidelity.

I claim—

1. A shell or valve-body provided with inlet and outlet ports and corresponding inlet and outlet valves, and a hollow arm adapted to connect the interior of said shell or valve-body with the interior of a separate fluid-pressure vessel, the said valves having a reciprocal motion to and from each other and to some extent with each other, and one of them being perforated or hollow to form one of said ports, which said port so formed is closed by contact between the two said valves, substantially as described.

2. The shell or valve-body A provided with the hollow arms B, I and O, and valves V and E, the said valves having a reciprocal motion to and from each other, and to some extent with each other, within said valve-body; and the valve E being hollow to furnish its own port, whereby communication may be established between said arm B and either said arm I or said arm O, or cut off between said arm B and both said arms I and O, substantially as described.

NELSON CURTIS.

Witnesses:
W. W. SWAN,
WM. S. ROGERS.